United States Patent [19]

Rizzo et al.

[11] 4,278,848

[45] Jul. 14, 1981

[54] AUTOMATICALLY ADJUSTABLE BIDIRECTIONAL-TO-UNIDIRECTIONAL TRANSMISSION NETWORK

[75] Inventors: Joseph F. Rizzo, Lodi; John A. Rudisill, Jr., Flanders, both of N.J.

[73] Assignee: Bell Telephone Laboratories, Incorporated, Murray Hill, N.J.

[21] Appl. No.: 64,041

[22] Filed: Aug. 6, 1979

[51] Int. Cl.³ .............................................. H04B 1/58
[52] U.S. Cl. .................................................. 179/170 D
[58] Field of Search ........ 179/170 R, 170 D, 170 NC

[56] References Cited

U.S. PATENT DOCUMENTS

| | | | |
|---|---|---|---|
| 3,178,521 | 4/1965 | Brown | 179/170 D |
| 3,982,080 | 9/1976 | Ukeiley | 179/170 D |
| 4,096,361 | 6/1978 | Crawford | 179/170 D |
| 4,096,362 | 6/1978 | Crawford | 179/170 D |
| 4,103,118 | 7/1978 | Bergman | 179/170 D |

FOREIGN PATENT DOCUMENTS 1115216  5/1968  United Kingdom ................ 179/170 D

*Primary Examiner*—Bernard Konick
*Assistant Examiner*—Randall P. Myers
*Attorney, Agent, or Firm*—Thomas Stafford

[57] ABSTRACT

Transhybrid loss is maximized in a transmission network (FIG. 1, 101) of the type for coupling a bidirectional transmission facility (102, 2-wire) to receive (103) and transmit (104) unidirectional transmission facilities (4-wire) by automatically adjusting impedance elements (RKN, RZN, etc.) of an impedance network (202, FIG. 3, FIG. 4) to obtain an optimum match to the impedance of the bidirectional facility (102). To this end, individual ones of a plurality of tones (107) are supplied to a receive port (111) of the transmission network (101) and the impedance elements (RKN, RZN, etc.) are controllably adjusted in a prescribed sequence (FIGS. 8–16) to obtain amplitude nulls at a transmit port (112) of the transmission network (101). In one embodiment, predetermined ones of the impedance adjustments (RKN, RZN, etc., 820–823, 828–831) are iterated with predetermined ones of the tone signals being supplied to the receive port (111) further to optimize the impedance match.

10 Claims, 16 Drawing Figures

AUTOMATICALLY ADJUSTABLE BIDIRECTIONAL-TO-UNIDIRECTIONAL TRANSMISSION NETWORK

CROSS-REFERENCE TO RELATED APPLICATIONS

U.S. Pat. Application entitled "Automatically Adjustable Bidirectional-to-Unidirectional Transmission Network", Ser. No. 64,042 is being filed in the U.S. Patent and Trademark Office concurrently herewith.

TECHNICAL FIELD

This invention relates to transmission networks and, more particularly, to circuit arrangements for automatically adjusting bidirectional-to-unidirectional transmission networks to maximize signal loss between a receive unidirectional facility and a transmit unidirectional facility in a 4-wire transmission system.

BACKGROUND OF THE INVENTION

A number of arrangements are known in the art for coupling signals from a bidirectional transmission facility to receive and transmit unidirectional transmission facilities. One example of this type transmission network is employed to couple a two-wire bidirectional telephone transmission facility to a four-wire transmission facility. These arrangements are commonly referred to as hybrid circuits, whether they employ a hybrid transformer or not.

As is now known, it is desirable to adjust a complex impedance circuit in the transmission coupling network in order to obtain a better match to the impedance of the bidirectional transmission facility thereby maximizing loss between the receive and transmit unidirectional facilities. This is commonly referred to as maximizing transhybrid loss.

Many transmission networks employ so-called hybrid networks to realize the desired two-to-four wire coupling. Transmission networks employing either hybrid transformers or electronic circuits are now commonly employed in telephone transmission systems to realize the desired two-to-four wire coupling. In using either a hybrid transformer or an electronic "hybrid" it is desirable to employ a network having an impedance which substantially matches the impedance of the bidirectional transmission facility. Otherwise, low transhybrid loss results which, in turn, yields unwanted signal reflections. That is to say, a portion of the signal on the receive unidirectional facility appears in the transmit unidirectional facility. To this end, in transformer type hybrids, a complex impedance network is employed in an attempt at matching the impedance of the two-wire facility. Similarly, in electronic canceller type hybrids, a network having a complex transfer (impedance) characteristic is employed to generate an error signal in attempting to cancel unwanted signals in the transmit unidirectional facility.

In either arrangement adjustable impedance networks have been used in order to obtain a better impedance match to the bidirectional facility and, hence, to maximize transhybrid loss.

In transmission networks which employ hybrid transformers it has become the practice to employ an electronic network to generate a driving point impedance which emulates the complex impedance of the bidirectional transmission facility and, thereby, balance the hybrid transformer. Heretofore, the balance network was manually adjusted in an attempt at obtaining an optimum match to the impedance of the bidirectional facility. In one known arrangement, a random noise signal is applied to the receive port of the hybrid transformer while elements of the balance network are manually adjusted to obtain amplitude null indications at the hybrid transmit port. Three separate noise bands have been employed in an attempt at manually obtaining optimum adjustment, for example, for a non-loaded two-wire facility. Manual adjustment of balance networks is undesirable because of cost factors and the time required to make the adjustment. Indeed, in such arrangements it is practical only to make a manual adjustment upon installation. Therefore, any change in the impedance of the two-wire facility because of either a change in the length thereof or otherwise requires another manual adjustment. Reliance on human adjustment is also undesirable because of possible errors.

More recently, balance of hybrid transformers in coupling networks has been achieved automatically by employing an adjustable balance network in conjunction with a control circuit. One prior automatic balance network is disclosed in U.S. Pat. No. 4,096,362 issued to C. D. Crawford on June 20, 1978. In the Crawford balance network, a control circuit is employed which includes analog circuits responsive to signals developed at ports of the hybrid to which the bidirectional transmission facility and the balance network are connected. A random noise signal is supplied to the receive port while the transmit port is terminated in a prescribed impedance in an attempt at emulating in service hybrid operating conditions. To this end, the receive and transmit ports of the hybrid are connected to a random noise source and an open circuit, respectively, to obtain the desired circuit arrangement. Individual analog circuits are employed to continuously generate nulling signals for adjusting the impedance elements of an adjustable balance network as disclosed in U.S. Pat. No. 3,919,502 issued to G. T. Daryanani on July 31, 1975. Use of analog circuits in conjunction with a random noise source to obtain the desired nulling signals is undesirable because of the time required to achieve the desired balance settings. Additionally, use of a random noise source to generate signals for developing the null settings is undesirable because of the settling time of the circuit. Moreover, use of the signals developed at the bidirectional facility connection and the balance network connection to the hybrid to generate the nulling control signals causes problems because of noise developed on the bidirectional transmission facility. Consequently, bandpass filters are required to limit the input to the control signal generating circuit. In turn, this increases response time of the control circuit. Furthermore, employing signals detected at the bidirectional facility connection and the balance network connection to the hybrid transformer also requires transformer coupling to achieve desired isolation of the circuit functions. Therefore, this prior balance arrangement is not readily fabricated by utilizing large-scale integration. Furthermore, the slow response of prior analog circuit arrangements is undesirable when employing the coupling circuit in switched telephone systems.

Thus, although the prior known balance arrangements are satisfactory for some applications they are undesirable for others where rapid response time is required; for example, when it is desired to achieve a new balance for each telephone off-hook condition.

SUMMARY OF THE INVENTION

Transhybrid loss is maximized in a transmission network for coupling receive and transmit unidirectional facilities to a bidirectional facility, in accordance with one aspect of the invention, by controllably adjusting elements of an adjustable impedance circuit in the transmission network to obtain signal amplitude nulls at the transmit port of the network when supplying individual ones of at least a plurality of tone signals in a prescribed sequence to the receive port of the network. In one embodiment each of the tone signals has a predetermined frequency.

More specifically, individual impedance adjustments are made with elements in the adjustable impedance circuit at each of the tone frequencies in a predetermined sequence to obtain the amplitude null indications at the transmit port. Then, in one embodiment predetermined ones of the impedance adjustments are iterated at predetermined individual ones of the tone frequencies further to optimize the adjustable impedance value. Thereafter, the impedance adjustments are fixed until an adjustment cycle is again initiated. Consequently, an optimum match of the bidirectional facility impedance is automatically obtained, thereby maximizing transhybrid loss. This may occur, for example, at the incidence of each telephone off-hook condition.

In one embodiment of the invention, a control logic circuit is employed to generate signals for adjusting impedance elements in an adjustable impedance network to obtain the desired null indications and, hence, to obtain the desired maximization of transhybrid loss. The control logic also controls a tone signal source to supply individual ones of the at least plurality of tone signals, each having a predetermined frequency, to the receive port of the bidirectional-to-unidirectional transmission network. A detection circuit under control of the control logic samples the signal amplitude at the transmit port. The control logic generates signals for adjusting the impedance elements of the adjustable impedance circuit in a prescribed sequence to obtain an amplitude null indication at the transmit port. In one example, a first step in the adjustment sequence includes adjusting a first impedance element at a first tone frequency until an amplitude null is obtained, adjusting a second impedance element at a second tone frequency until an amplitude null is obtained, and adjusting a third impedance element at a third tone frequency until an amplitude null is obtained. A second step in the adjustment sequence includes again adjusting the first impedance element to obtain an amplitude null at the second tone frequency and, then, adjusting the second impedance element to obtain an amplitude null at the second tone frequency. The second step in the adjustment sequence is iterated until there is no change in the second impedance element value upon a subsequent iteration. A third step in the adjustment sequence includes again adjusting the first impedance element to obtain an amplitude null at the first tone frequency and, then, again adjusting the second impedance element to obtain an amplitude null at the first tone frequency. The third step in the adjustment sequence is thereafter iterated until there is no change in the value of the second impedance element upon a subsequent iteration thereof. Then, values for the first impedance element and the second impedance element obtained during the second and third steps of the sequence are averaged and employed to adjust the corresponding elements in the adjustable impedance circuit. The values of the first, second and third impedance elements are fixed until another balance cycle is initiated.

In another embodiment of the invention only first and second adjustable impedance elements and first and second tone signals are used for adjusting the impedance network to obtain an optimum impedance match to a bidirectional transmission facility.

In accordance with another aspect of the invention, a null search process is employed which first steps the impedance adjustment in a first predetermined direction until a first increase is detected in the amplitude of the signal at the transmit port of the network. Then, the impedance adjustment is stepped in a direction opposite the first direction until a second increase is detected in the amplitude of the signal at the transmit port. Thereafter, the impedance adjustment is stepped once in the first predetermined direction to obtain the desired amplitude null.

BRIEF DESCRIPTION OF THE DRAWING

The invention will be more fully understood from the following detailed description of illustrative embodiments thereof taken in connection with the appended figures in which.

DETAILED DESCRIPTION

Figure 1:
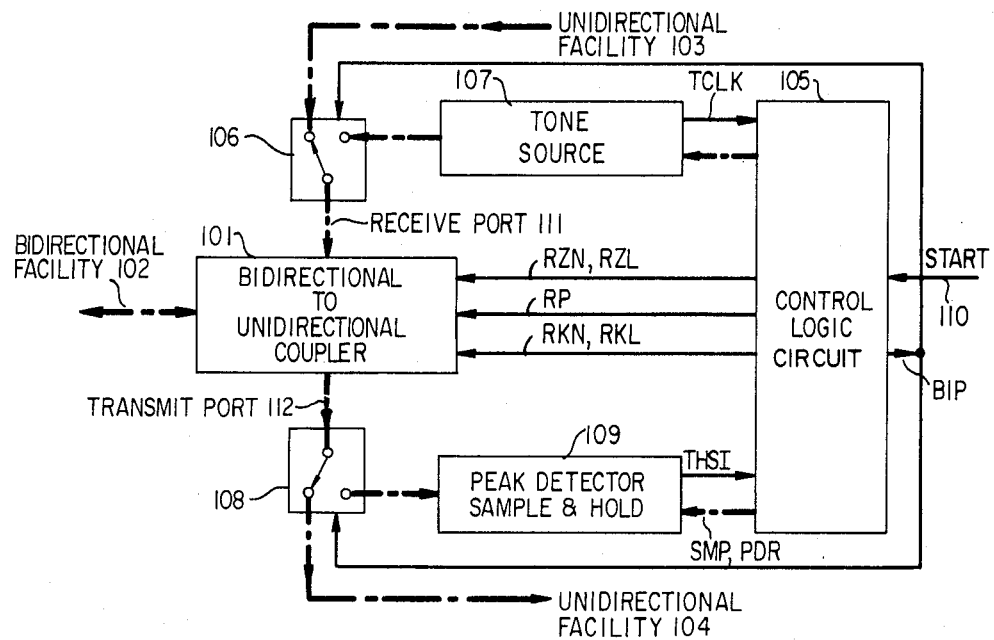
FIG. 1 shows in simplified block diagram form an arragement for coupling a bidirectional transmission facility to unidirectional receive and transmit transmission facilities including an automatically adjustable impedance network in accordance with aspects of the invention.

FIG. 1 shows in simplified block diagram form an automatically adjustable bidirectional-to-unidirectional transmission coupling network, for example, a two-wire to four-wire telephone coupling network employing the invention. Accordingly, shown is bidirectional-to-unidirectional coupler 101 for coupling bidirectional transmission facility 102 to receive unidirectional transmission facility 103 and transmit unidirectional transmission facility 104. Each transmission facility is, for example, a two-wire telephone line. Thus, coupler 101 is, for example, a two-wire to four-wire coupler. Control logic circuit 105 is employed to generate signals for adjusting impedance elements in coupler 101, for example, control signals RZN(L), RP and RKN(L), to minimize signals being received on receive facility 103 from being transmitted on transmit facility 104. That is to say, the impedance of coupler 101 is automatically adjusted to obtain an optimum match to the impedance of bidirectional facility 102 thereby maximizing transhybrid loss. To this end, control logic circuit 105 also generates signals for connecting receive port 111 via switching element 106 to tone source 107 and for connecting transmit port 112 via switching element 108 to peak detector, sample and hold circuit 109. During a normal transmission mode of operation coupler 101 is connected to receive and transmit transmission facilities 103 and 104 via switching elements 106 and 108, respectively. An impedance adjustment cycle is initiated in response to a start signal supplied via input 110. The start signal may be initiated, for example, manually by a craftsperson or electronically in response to a telephone off-hook indication.

Switching elements 106 and 108 may be any of numerous ones known in the art. Preferably, the switching is achieved electronically via use of summing amplifiers or the like including the capability to switch the inputs thereto as desired.

Tone source 107 generates a plurality of distinct output tones which are supplied under control of control logic circuit 105 on an individual basis via switching element 106 to receive port 111. To this end, tone source 107 comprises elements (not shown) including an oscillator, counter and plurality of low-pass filters for generating a plurality of tone signals. In this example, at least three tone signals are generated each having a predetermined frequency, for example, 2600 Hz, 1300 Hz and 325 Hz. Other frequency values may equally be employed in the embodiment of the invention. Inputs to the filters are controlled by signals from control logic circuit 105 which, in turn, control the supplying of the individual tones to receive port 111. Tone source 107 also generates signal TCLK (FIG. 6) which is a pulse signal having a frequency equal to the tone signal frequency being supplied from tone source 107 to facility 103. TCLK is employed in control logic circuit 105 as discussed below.

Bidirectional-to-unidirectional coupler 101 may be any one of a number of couplers known in the art and capable of being adjusted for obtaining an optimum match to the impedance of bidirectional facility 102 thereby maximizing signal loss from receive facility 103 to transmit facility 104. An example of an adjustable electronic hybrid is disclosed in U.S. Pat. No. 4,074,087 noted above.

Figure 2:
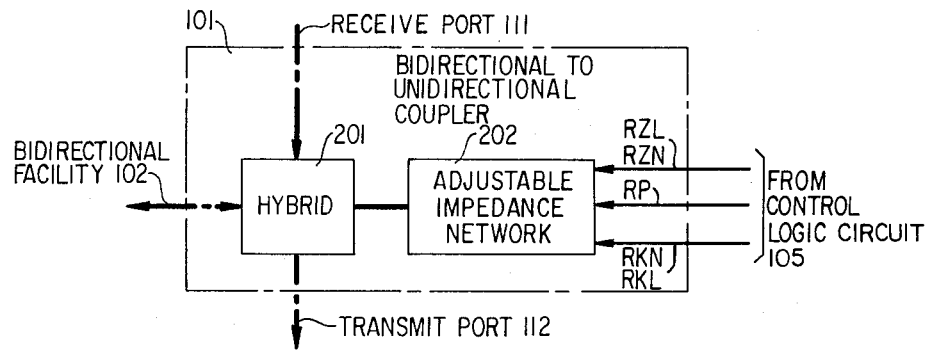
FIG. 2 depicts in simplified form details of the bidirectional to unidirectional coupler of FIG. 1.

FIG. 2 shows in simplified form details of one arrangement which may be employed in bidirectional-to-unidirectional coupler 101 which includes hybrid transformer 201 and adjustable impedance network 202. Network 202, in this example, is responsive to control signals, for example, RZN(L), RP and RKN(L) from control logic circuit 105 to obtain an impedance which is an optimum match to the impedance of a particular bidirectional transmission facility 102.

Figure 3:
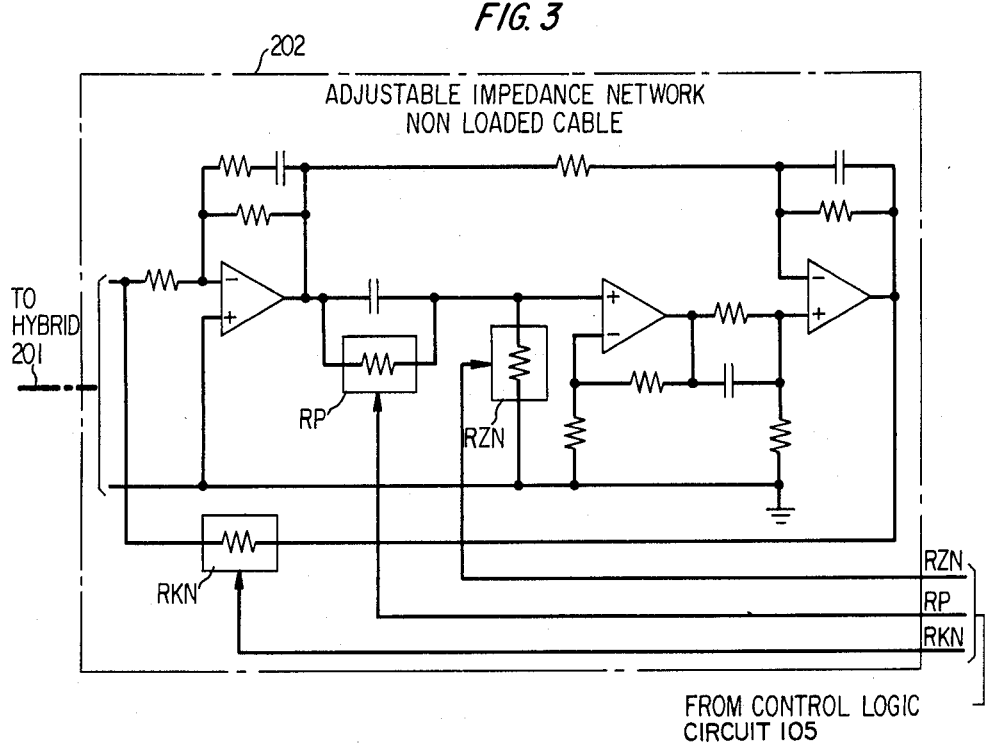
FIG. 3 illustrates an adjustable impedance network intended for use in the bidirectional to unidirectional coupler of FIG. 2 when matching nonloaded telephone cable.

FIG. 3 shows in simplified form details of one adjustable impedance network which may be advantageously employed for network 202 of FIG. 2. This adjustable impedance network is of a type intended to match the impedance of nonloaded (N) bidirectional two-wire cable and includes a variable scalor multiplier controlled by resistor RKN, a variable real pole controlled by resistor RP, and a variable real zero controlled by resistor RZN. Additionally, this circuit includes a fixed real pole and a fixed real zero. It has been determined that the RKN resistor adjustment affects the impedance-versus-frequency characteristic of network 202 equally across the voiceband, while the RZN resistor adjustment affects the high frequency portion and the RP resistor adjustment affects the low frequency portion. We have also determined that individual tone signals at predetermined frequencies may be supplied to receive port 111 of hybrid network 201 while adjusting the individual impedances RKN, RZN and RP in a prescribed sequence including individual predetermined iterative portions thereof, in accordance with an aspect of the instant invention, to achieve an optimum impedance match to the impedance of bidirectional nonloaded two-wire telephone facility 102. Heretofore, it was believed that only bands of random noise signals could be employed to achieve an optimum balance. However, the use of individual tone signals and the use of an iterative process has improved the speed of the adjustment process for nonloaded telephone cable. Moreover, it is easier to generate the individual tone signals as compared to bands of random noise. The adjustable impedance network of FIG. 3 is essentially identical to a network shown in FIG. 3 of U.S. Pat. No. 3,919,502 noted above. The only differences between the adjustable impedance network shown in the above-noted patent and the network shown in FIG. 3 herein being that resistors RKN, RP and RZN are controllably variable impedances, for example, resistors which are adjusted in response to control signals RKN, RP and RZN, respectively, generated by control logic circuit 105. Numerous arrangements known in the art may be employed to realize the adjustable impedances RKN, RP and RZN.

Figure 4:
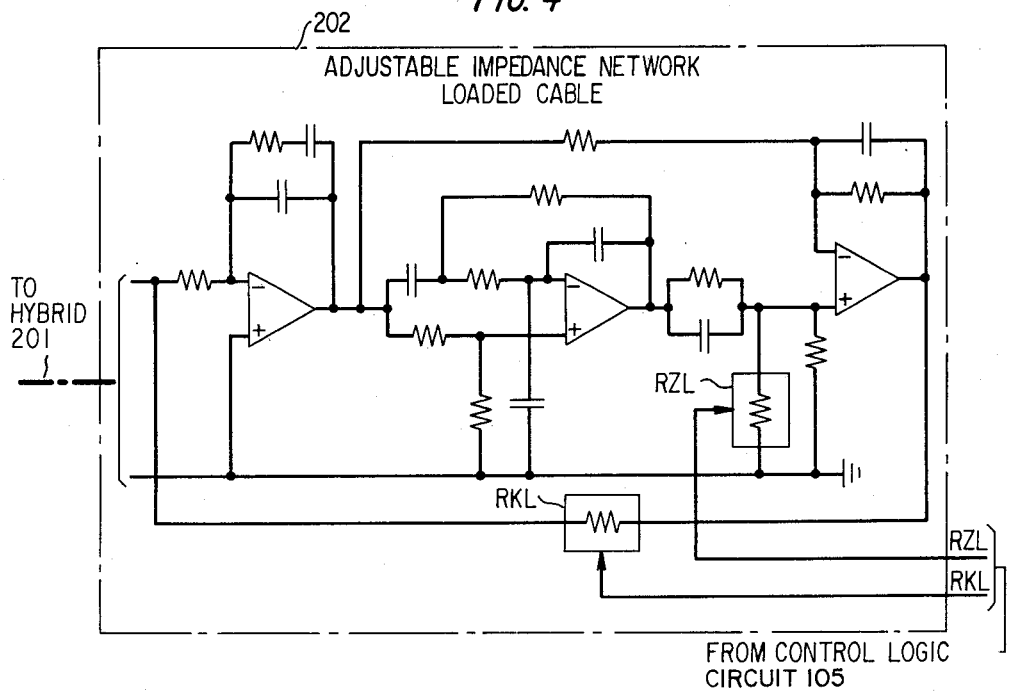
FIG. 4 illustrates an adjustable impedance network intended for use in the bidirectional to unidirectional coupler of FIG. 2 when matching loaded telephone cable.

FIG. 4 shows in simplified form details of another adjustable impedance network which may be advantageously employed for network 202 of FIG. 2. This adjustable impedance network is intended for use in matching the impedance of a loaded (L) bidirectional two-wire telephone transmission facility 102. It is noted, however, that this balance network only has a variable scalor multiplier controlled by resistor RKL and a variable real zero controlled by resistor RZL. This network is essentially identical to a network shown in FIG. 6 of U.S. Pat. No. 3,919,502 noted above and described therein. The only differences between the network shown in the noted patent and the network shown in FIG. 4 herein being that resistors RKL and RZL are controllable variable impedance and are adjustable in response to control signals RKL and RZL, respectively, generated by control logic 105. Consequently, when using the adjustable impedance network shown in FIG. 4 herein, control logic circuit 105 generates only control signals RKL and RZL. Therefore, the circuit arrangement for generating control signal RP may be eliminated.

Figure 5:
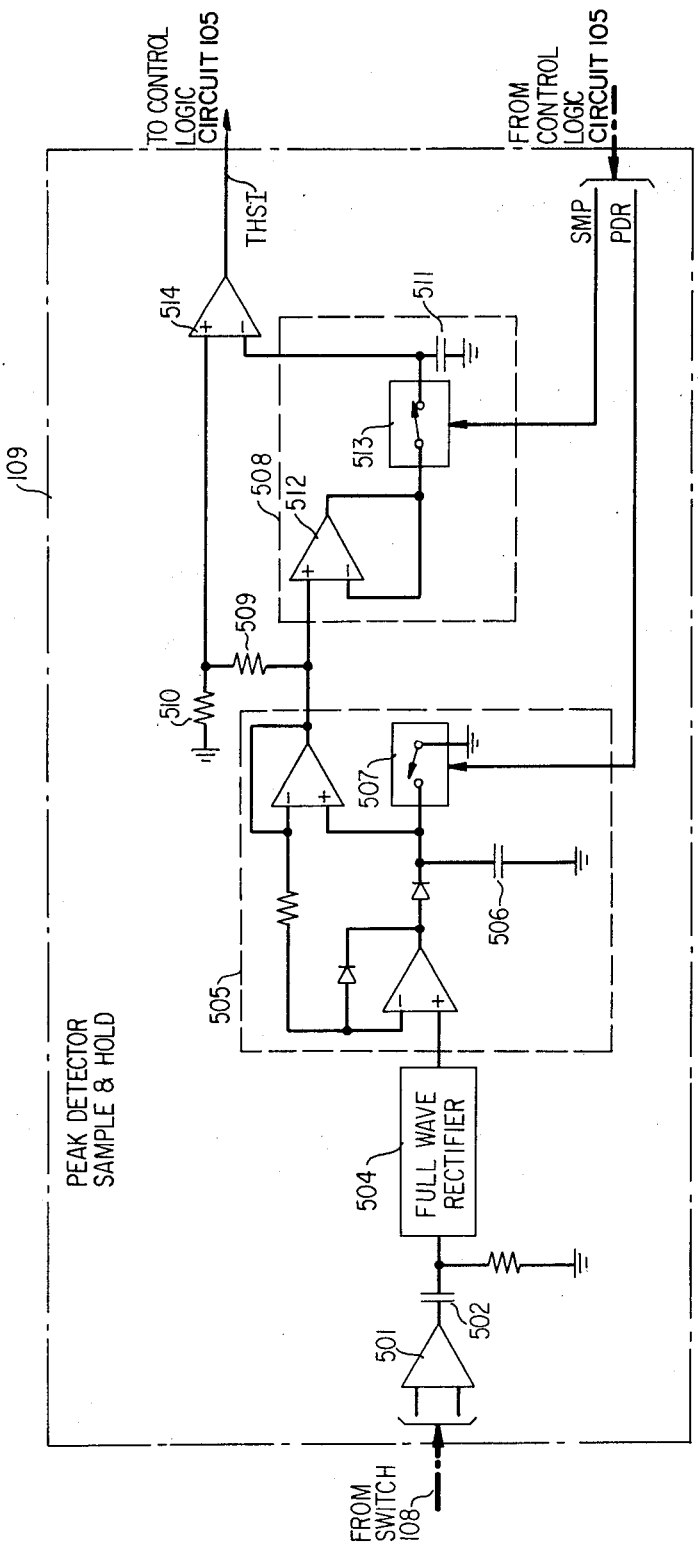
FIG. 5 shows in simplified form details of the peak detector, sample and hold circuit used in FIG. 1.

FIG. 5 shows in simplified form details of peak detector, sample and hold circuit 109. A balanced input from transmission port 112 (FIG. 1) is supplied via switching element 108 to buffer amplifier 501. Although shown as a part of circuit 109 amplifier 501 may be included as part of transmission facility 104 or as part of switching element 108. An output from amplifier 501 is supplied via coupling capacitor 502 to full wave rectifier 504. In turn, the full wave rectified output from rectifier 504 is supplied to peak detector 505. Peak holding capacitor 506 is shunted by controllable switching element 507 which is controlled to reset detector 505 via control signal PDR from control logic circuit 105 (FIG. 1). An output from peak detector 505 is supplied to sample and hold circuit 508 and to a voltage divider including resistors 509 and 510. The output from peak detector 505 is controllably supplied to holding capacitor 511 via buffer amplifier 512 and controllable switching element 513. Switching element 513 is controlled by control signal SMP from control logic circuit 105. A signal developed at the junction of resistors 509 and 510 is supplied to a first input of comparator 514 while a signal developed across capacitor 511 is supplied to a second input of comparator 514. The resistance value of resistor 510 is approximately 40 times greater than the resistance value of resistor 509. This establishes a prescribed detection threshold for determining whether the output of peak detector 505 is greater than the output of sample and hold 508. Comparator 514 yields an indication of whether the presently detected peak value from peak detector 505 is larger or smaller than the last sampled value stored on capacitor 511. An output from comparator 514 designated THSI is supplied to control logic circuit 105. The signal developed at output THSI is limited either to a positive potential representative of a logical "1" or to substantially zero potential representative of a logical "0". The logical "1" THSI output indicates that the presently detected peak value from peak detector 505 is greater than the last sampled peak value stored on capacitor 511. Conversely, the logical "0" output indicates that the presently detected peak value from detector 505 is less than the last sampled peak value stored on capacitor 511. Control signal PDR controls resetting of peak detector 505 to an initial condition while control signal SMP controls sampling of the output from detector 505.

Figure 6:
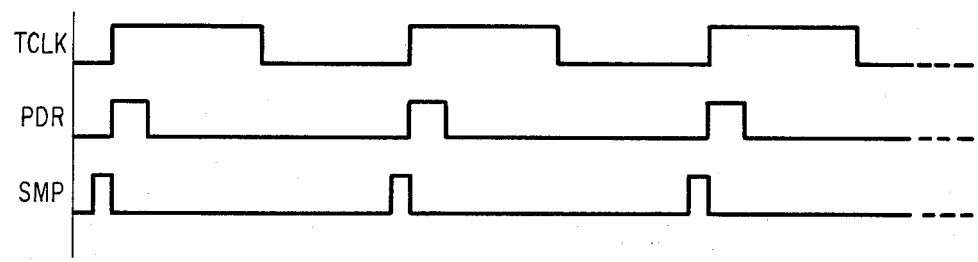
FIG. 6 depicts a sequence of waveforms useful in describing the operation of the peak detector, sample and hold circuit of FIG. 5.

FIG. 6 is a timing diagram illustrating the peak detecting, sampling and interrogating process. Signals PDR and SMP are generated in prescribed relationship to signal TCLK from tone source 107 (FIG. 1). Similarly, output THSI from comparator 514 (FIG. 5) is interrogated by control logic circuit 105 just before the output from detector 505 is again sampled. That is, THSI is sampled just prior to generation of SMP. Signal TCLK is a pulse signal having the same frequency as the individual tone signal being generated by source 107.

Figure 7:
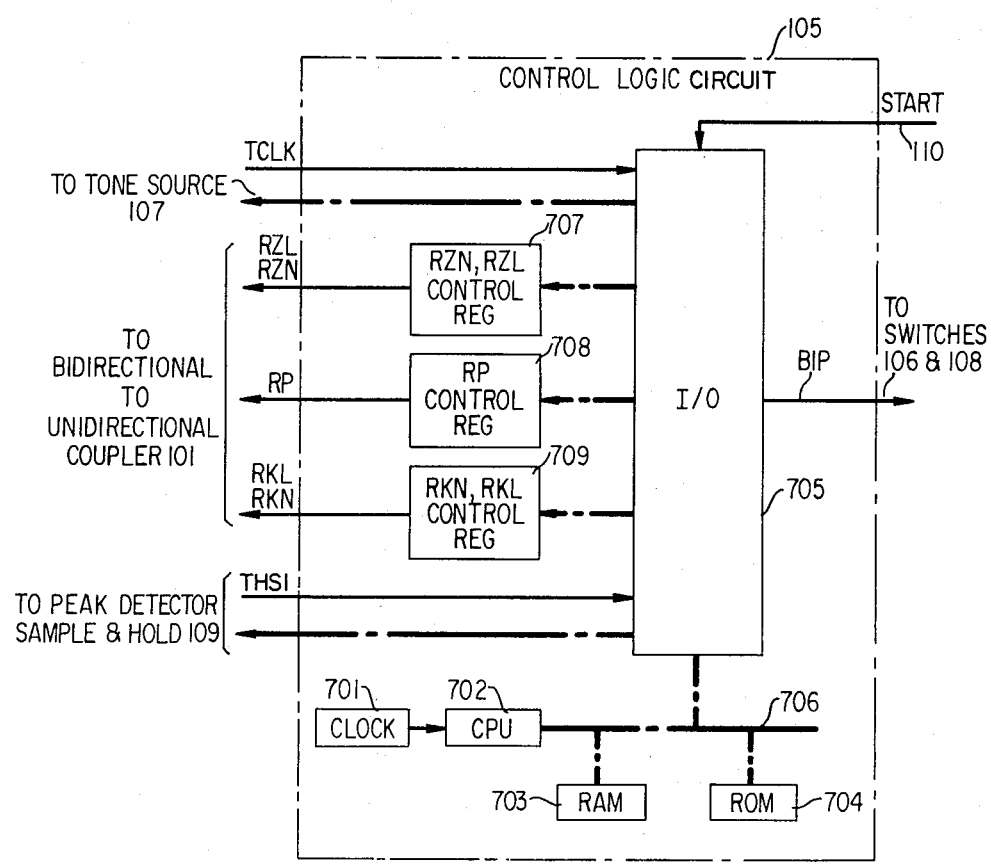
FIG. 7 shows in simplified block diagram form details of the control logic circuit employed in FIG. 1.

FIG. 7 shows in simplified block diagram form details of one arrangement which may be advantageously employed as control logic circuit 105. Although control logic circuit 105 may be implemented using any of several arrangements known in the art, a microcomputer is preferable. Accordingly, shown are clock circuit 701, central processor unit (CPU) 702, read-write memory unit, commonly referred to as random access memory (RAM) 703, read-only memory (ROM) 704, and input/output unit (I/O) 705, all interconnected via bus 706 to form a microcomputer system. Clock 701 generates timing signals for CPU 702. Also included in control logic circuit 105 are a plurality of control registers, namely, RZN(L) control register 707, RP control register 708 annd RKN(L) control register 709. Control registers 707, 708 and 709 are employed to generate control signals RZN(L), RP and RKN(L) which, in turn, are supplied to bidirectional-to-unidirectional coupler 101. Control registers 707 and 709 are utilized when employing both a nonloaded (N) adjustable impedance network 202 and a loaded (L) adjustable impedance network 202. Register 708 is used in this example only when a nonloaded adjustable impedance network 202 is being employed. In an example from experimental practice, an Intel 8748 microcomputer system has been employed in conjunction with control registers 707, 708 and 709 to form control logic circuit 105. Operation and programming of the Intel 8748 system is described in "Intel MCS-48 Family of Single Chip Microcomputers—Users Manual", dated 1978.

CPU 703 includes a plurality of working registers which are employed in the process of generating control signals for adjusting the impedance values of the particular adjustable impedance network 202 (FIG. 2). Programs for effecting the desired impedance adjustments are stored in ROM 704.

Operation of control logic circuit 105 in generating control signals for adjusting an adjustable impedance network 202, in accordance with one aspect of the invention, is described in the digital program listing shown in the appendix. This program listing written in assembly language for the Intel 8748 microcomputer system is a description of the set of electrical control signals that serve to configure control logic circuit 105 into a machine capable of generating control signals for adjusting impedances in a nonloaded adjustable impedance network as shown in FIG. 3 to obtain an optimum match to a particular nonloaded bidirectional telephone facility 102 in the automatically adjustable network of FIG. 1.

Figure 12:
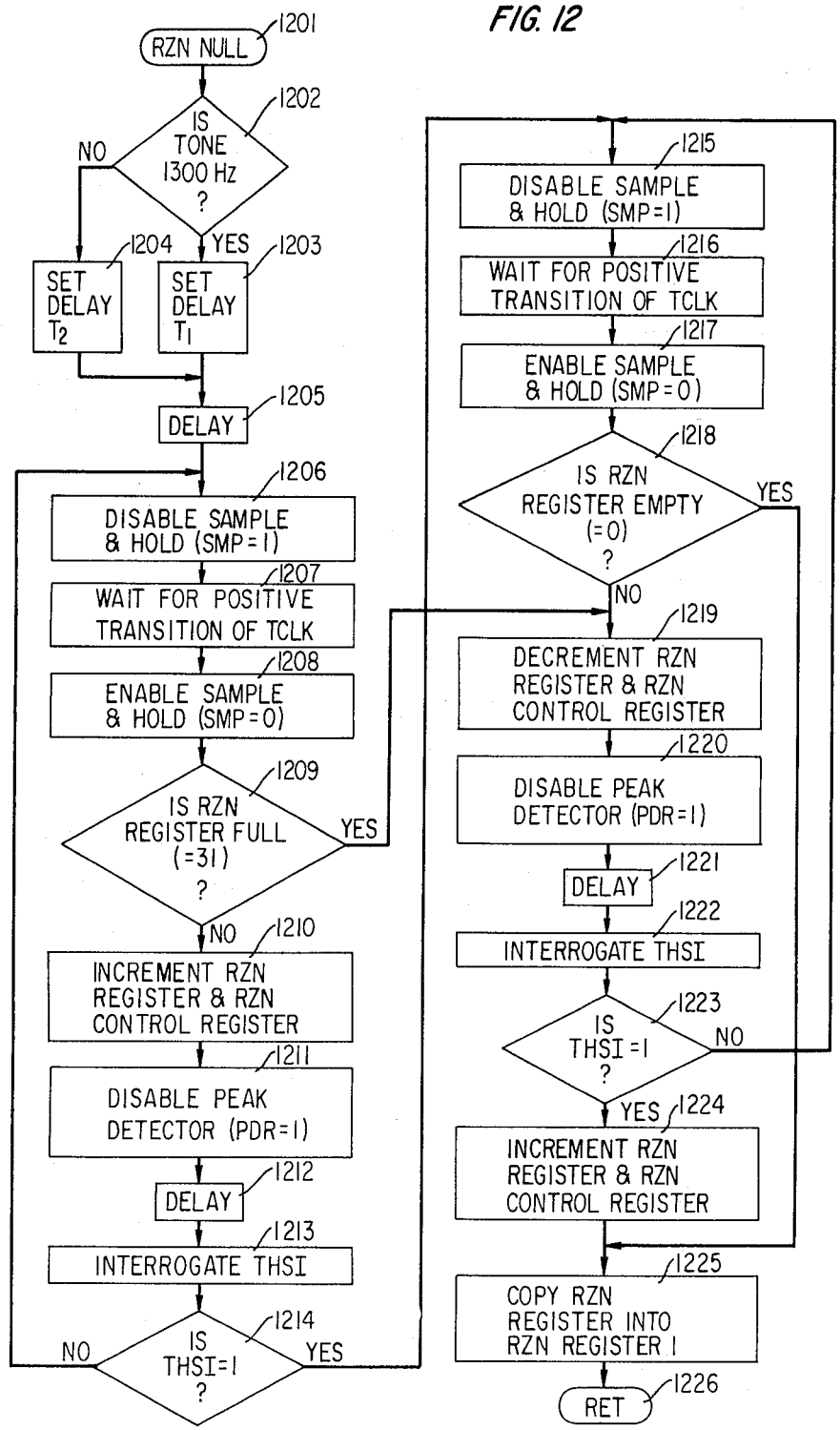
FIG. 12 is a flow chart of RZN null program subroutine employed in the flow chart of FIGS. 8, 9, and 10.
Figure 13:
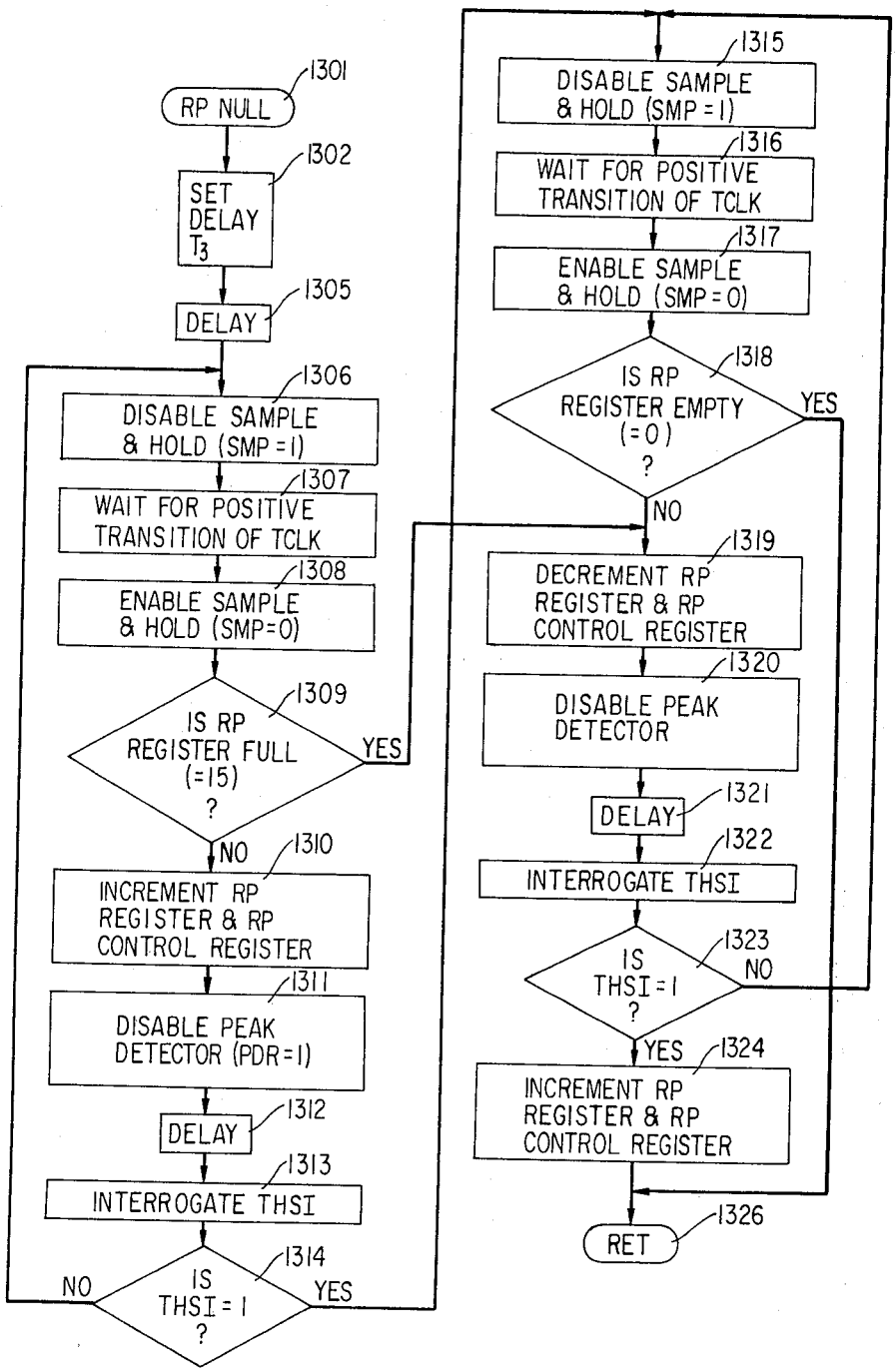
FIG. 13 is a flow chart of the RP null program subroutine used in the flow chart of FIGS. 8, 9, and 10.
Figure 14:
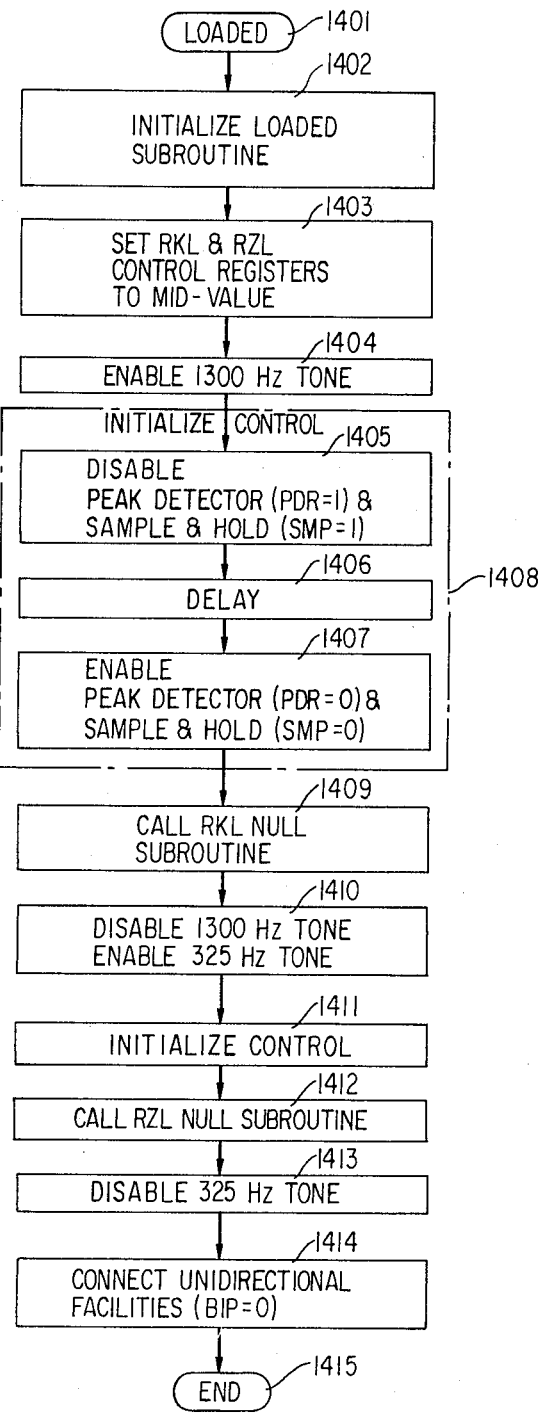
FIG. 14 is a flow chart of a main program routine illustrating a sequence of steps employed in another embodiment of the invention for adjusting impedance of the bidirectional coupler of FIG. 1 to effect an optimum impedance match for a loaded bidirectional transmission facility.
Figure 15:
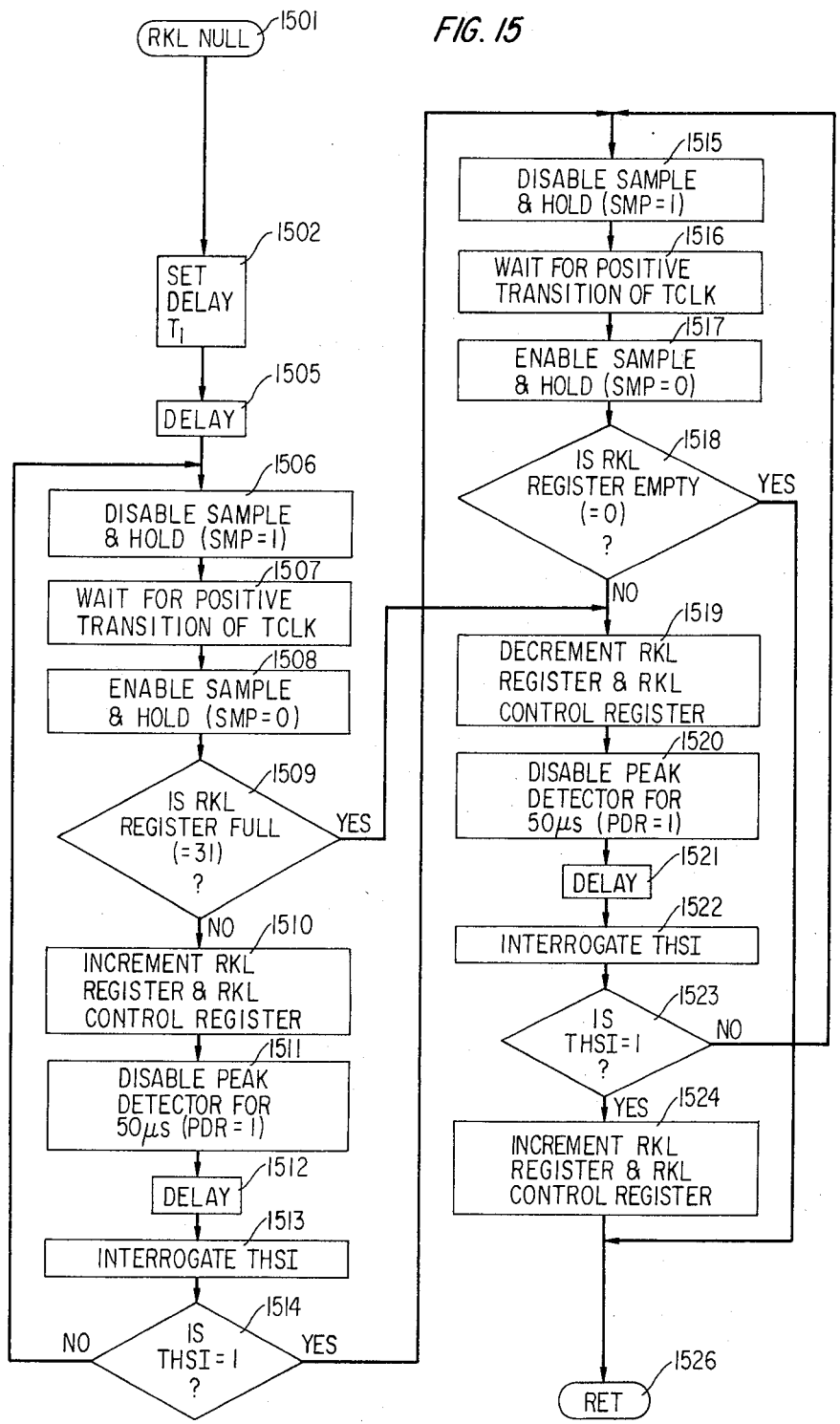
FIG. 15 is a flow chart of the RKL null program subroutine employed in the flow chart of FIG. 14.
Figure 16:
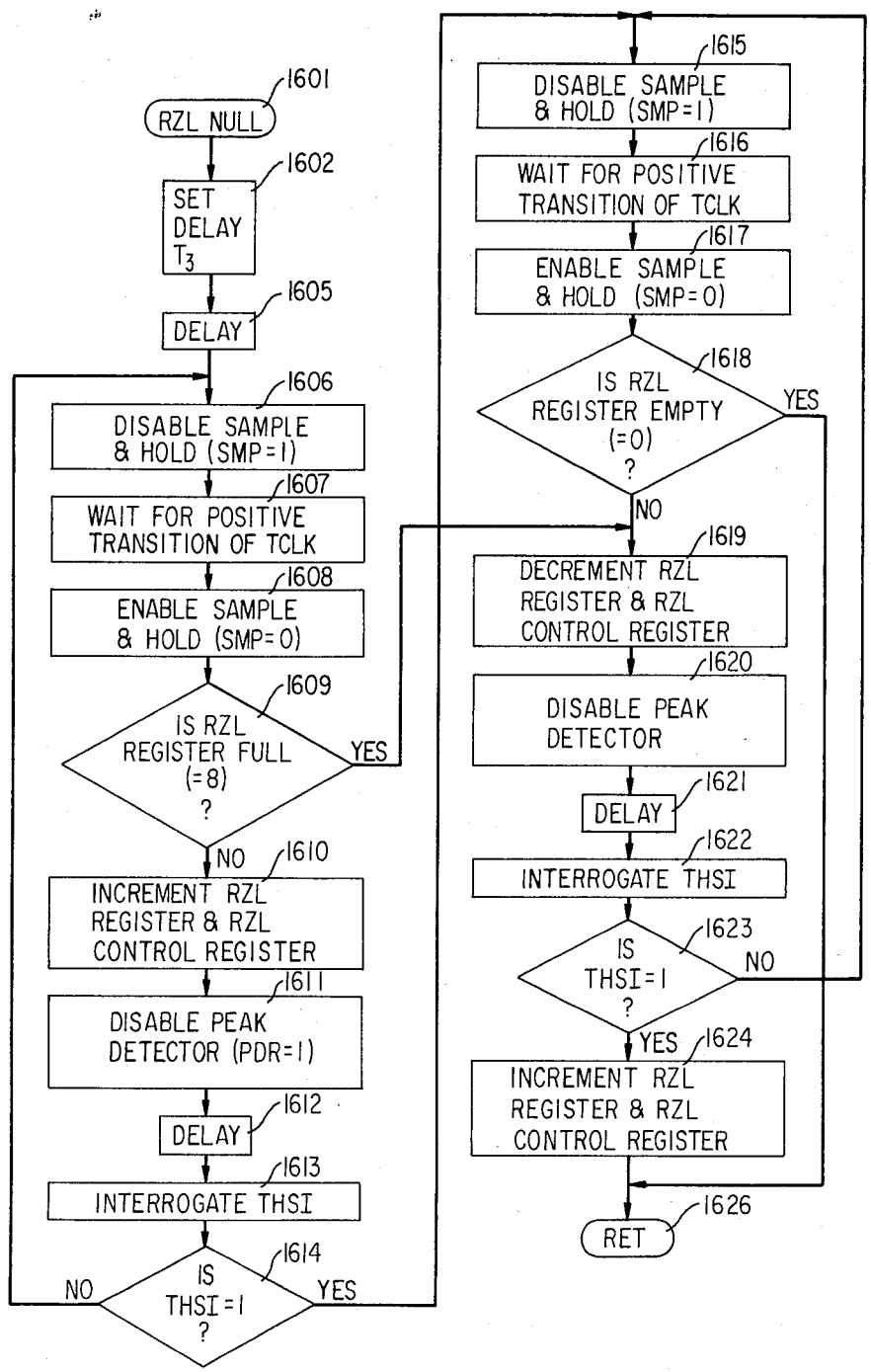
FIG. 16 is a flow chart of the RZL null program subroutine employed in the flow chart of FIG. 14.

The program listing and, hence, operation of the automatically adjustable network of FIG. 1, in accordance with an aspect of the invention, is more readily understood with the aid of the flow charts shown in FIGS. 8 through 13 for a nonloaded adjustable impedance network as shown in FIG. 3. Flow charts are shown in FIGS. 14 through 16 which show how control logic circuit 105 is configured, in accordance with another aspect of the invention, to generate control signals for adjusting a loaded adjustable impedance network as shown in FIG. 4 for obtaining an optimum match to a loaded bidirectional telephone facility 102 in FIG. 1. It will be apparent to those skilled in the art from the nonloaded program listing shown in the appendix and the flow charts shown in FIGS. 14 through 16 how to prepare a program listing for the loaded cable version of the invention.

Figure 8:
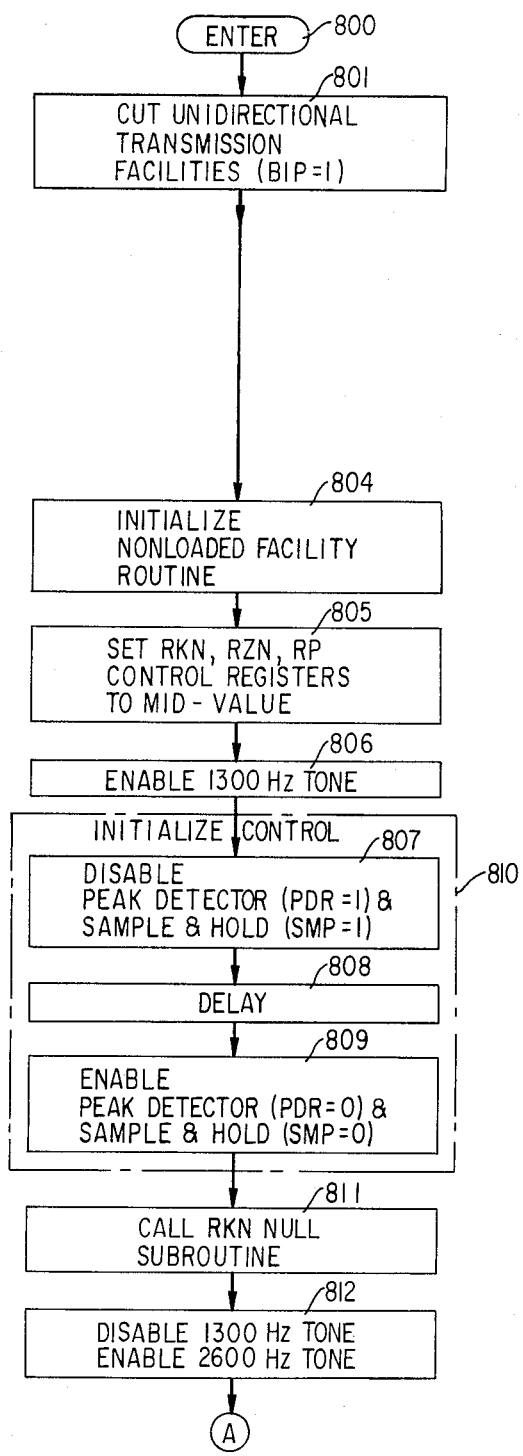
FIG. 8, 9 and 10 when connected A—A and B—B form a flow chart of a main program routine illustrating a sequence of steps employed in one embodiment of the invention for adjusting the impedance of the bidirectional to unidirectional coupler of FIG. 1, to effect an optimum impedance match for a nonloaded bidirectional transmission facility.
Figure 9:
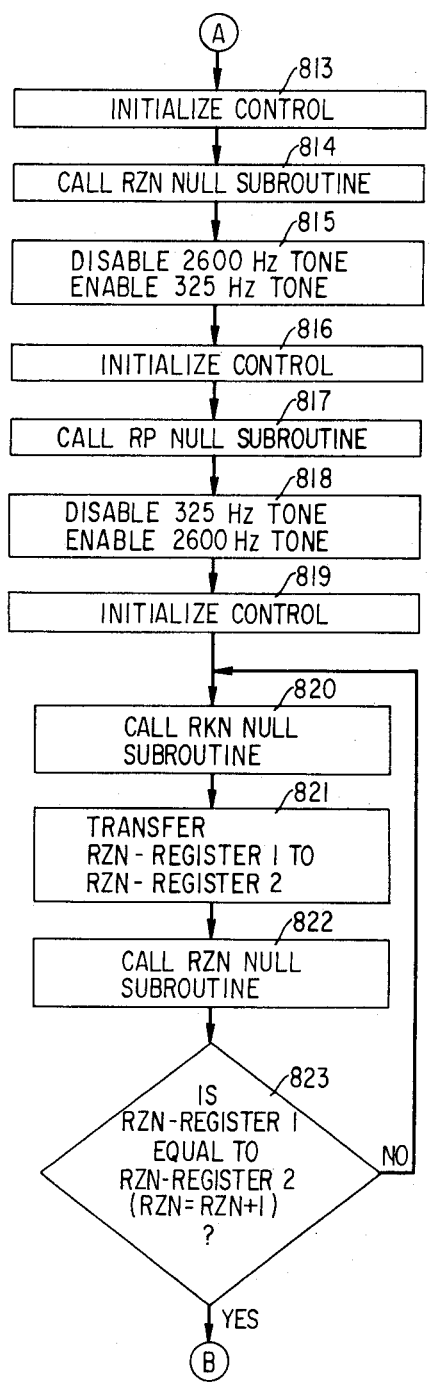
Figure 10:
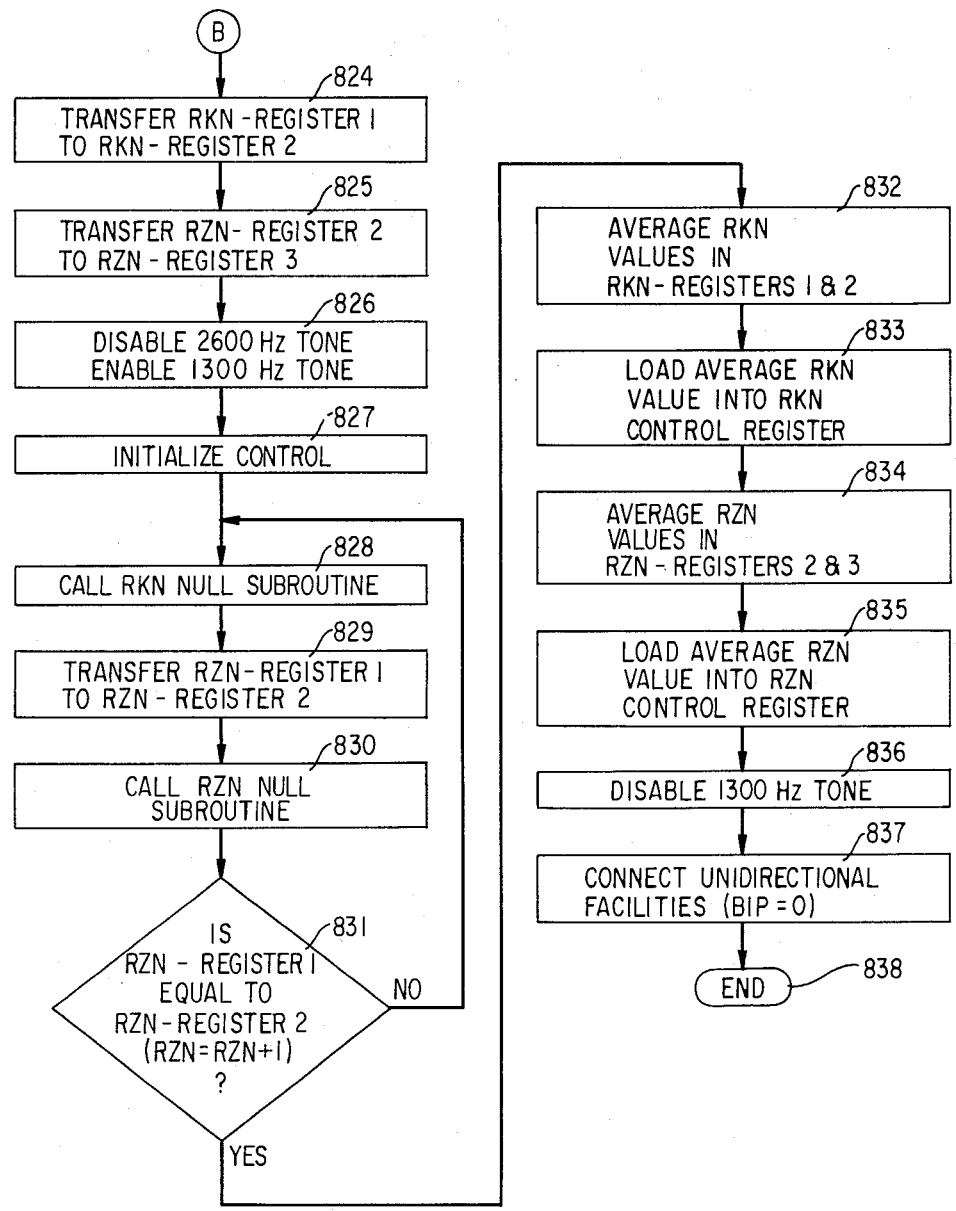

FIGS. 8, 9 and 10, when connected A—A and B—B, form a flow chart of a main program routine for generating in control logic circuit 105 control signals for automatically adjusting adjustable impedance network 202. The flow chart can be seen to include three different symbols, the oval symbols indicate the beginning and end of the routine, the rectangle symbols commonly referred to as operational blocks contain the description of a particular detailed operational step, and the diamond symbols commonly referred to as conditional branch points contain a description of a test performed by the microcomputer for enabling it to determine the next operation to be performed.

As shown in the flow chart of FIGS. 8, 9 and 10, the impedance network adjustment routine is entered at oval 800. Operational block 801 indicates that both receive unidirectional facility 103 (FIG. 1) and transmit unidirectional facility 104 are disconnected via switching elements 106 and 108, respectively, from bidirectional-to-unidirectional coupler 101 in response to a logical 1 BIP signal, i.e., BIP=1 from control logic 105. Additionally, receive port 111 of coupler 101 is connected via switching element 106 to tone source 107 and transmit port 112 of coupler 101 is connected via switching element 108 to peak detector, sample and hold 109. Simply stated, the automatically adjustable impedance control network is connected to bidirectional-to-unidirectional coupler 101. Control is thereafter transferred to operational block 804.

A nonloaded adjustment program routine is employed because facility 102 is a nonloaded (N) telephone facility.

Operational block 804 causes the nonloaded facility program routine to be initialized, i.e., clearing registers and the like.

Operational block 805 causes RKN control register 709, RZN control register 707 and RP control register 708 (FIG. 7) to be set to their respective mid-values.

Operational block 806 causes tone source 107 (FIG. 1) to be enabled for generating a first predetermined tone signal, in this example 1300 Hz.

Operational block 807 causes peak detector, sample and hold 109 (FIG. 1) to be disabled by supplying logical 1 PDR and SMP signals thereto, i.e., PDR=1, SMP=1.

Operational block 808 interposes a predetermined delay interval to insure that transients resulting from the generation of the tone signal diminish. In this example, the delay is equal to eight positive transitions of signal TCLK from tone source 107 or approximately 5 milliseconds.

Operational block 809 causes peak detector, sample and hold 109 to be enabled by supplying logical 0 PDR and SMP signals thereto, i.e., PDR=0, SMP=0.

Operational blocks 807, 808 and 809 in effect initialize the control circuitry prior to calling null search subroutines and are designated initialize control 810.

Figure 11:
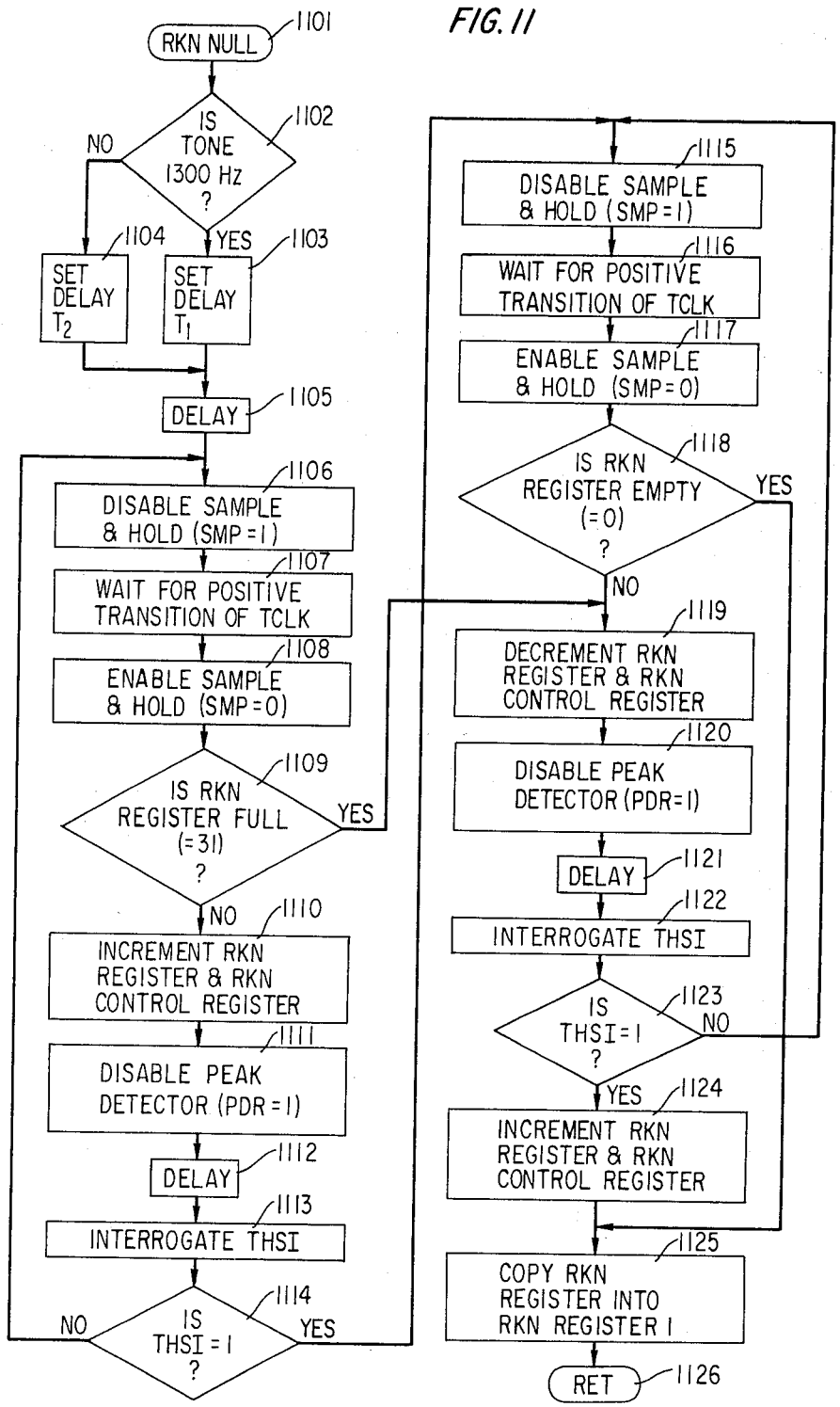
FIG. 11 is a flow chart of the RKN null program subroutine employed in the flow chart of FIGS. 8, 9, and 10.

Operational block 811 causes adjustable impedance RKN null subroutine to be called. A flow chart of the RKN null subroutine is shown in FIG. 11 and is described below. The RKN null subroutine controls generation of signal to effect a first impedance adjustment in a prescribed sequence, in accordance with an aspect of the invention, to generate a first amplitude null at transmit port 112 of coupler 101 (FIG. 1) while supplying the first predetermined tone to receive port 111 of coupler 101. Upon detection of the desired amplitude null control is transferred to operational block 812.

Operational block 812 causes control signals to be supplied to tone source 107 for disabling the first predetermined tone signal, in this example 1300 Hz, and for enabling a second predetermined tone, in this example 2600 Hz.

Operational block 813 which is identical to operational block 810 initializes the control function.

Operational block 814 causes adjustable impedance RZN null subroutine to be called. A flow chart of the RZN null subroutine is shown in FIG. 12 and is described below. RZN null subroutine controls generation of signals to effect a second impedance adjustment in the prescribed sequence, in accordance with an aspect of the invention, to generate a second amplitude null at transmit port 112 (FIG. 1) while supplying the second predetermined tone to receive port 111. Upon detection of the second amplitude null control is transferred to operational block 815.

Operational block 815 causes control signals to be supplied to tone source 107 for disabling the second predetermined tone, i.e., 2600 Hz and for enabling a third predetermined tone signal to be generated, in this example 325 Hz.

Operational block 816 which is identical to operational block 810 causes the control to be initialized.

Operational block 817 causes adjustable impedance RP null subroutine to be called. A flow chart of the RP null subroutine is shown in FIG. 13 and is described below. The RP null subroutine controls generation of signals to effect a third impedance adjustment in the prescribed sequence, in accordance with an aspect of the invention, to generate a third amplitude null at transmit port 112 (FIG. 1) while supplying the third predetermined tone signal to receive port 111. Upon detection of the third amplitude null control is transferred to operational block 818.

Operational block 818 causes control signals to be supplied to tone source 107 for disabling generation of the third predetermined tone, i.e., 325 Hz and for again enabling generation of the second predetermined tone, i.e., 2600 Hz.

Operational block 819 which is identical to operational block 810 again causes the control to be initialized.

Operational block 820 causes the RKN null subroutine to be called again. Once the RKN null subroutine is completed control is transferred to operational block 821.

Operational block 821 causes the RZN control value determined in operational block 814 to be transferred from RZN register 1 in RAM 703 to RZN register 2 in RAM 703.

Operational block 822 causes adjustable register RZN null subroutine to be called again. Upon completion of the RZN null subroutine control is transferred to conditional branch point 823.

Conditional branch point 823 tests to determine if the value stored in RZN register 1 is equal to the value stored in RZN register 2, i.e., RZN=RZN+1. If the test result is yes, control is transferred to operational block 824. However, if the test result is no, control is again returned to operational block 820. The process controlled by operational blocks 820, 821 and 822, and conditional branch point 823 is a first iterative impedance adjustment which continues until the value in RZN register 1 equals the value in RZN register 2. That is to say, impedance elements RKN and RZN are adjusted in a predetermined sequence until the value of RZN remains constant upon repeating the iterative sequence. The first iterative impedance adjustments with the second tone signal being supplied in the prescribed adjustment sequence further optimize, in accordance with an aspect of the invention, the impedance adjustments of RKN and RZN. This iterative process is needed because of interaction between the individual impedance adjustments. Once RZN equals RZN+1 control is transferred to operational block 824, i.e., the test result is yes.

Operational block 824 causes the value in RKN register 1 obtained in operational block 811 to be transferred to RKN register 2.

Operational block 825 causes the RZN value in RZN register 2 obtained in operational block 822, when the test in conditional branch point 823 yields a yes result, to be transferred to RZN register 3.

Operational block 826 causes control signals to be supplied to tone source 107 for disabling the second predetermined tone, i.e., 2600 Hz and, again, enabling the first predetermined tone, i.e., 1300 Hz.

Operational block 827 which is identical to operational block 810 causes the control to be initialized.

Operational block 828 causes adjustable impedance RKN null subroutine to be called.

Operational block 829 causes the RZN value stored in RZN register 1 to be transferred to RZN register 2.

Operational block 830 causes adjustable impedance RZN null subroutine to be called.

Conditional branch point 831 tests to determine if the RZN value in RZN register 1 is equal to the RZN value in RZN register 2, i.e., RZN=RZN+1. If the result is yes, control is transferred to operational block 832. However, if the test result is no, control is again transferred to operational block 828 and the above process is iterated until a yes test result in conditional branch point 831 is obtained. The process controlled by operational blocks 828, 829 and 830, and conditional branch point 831 is a second iterative process which continues until the value in RZN register 1 again equals the value in RZN register 2. That is to say, impedane elements RKN and RZN are adjusted in a predetermined sequence until the value of RZN remains constant upon repeating the iterative sequence. The second iterative impedance adjustments with the first tone signal being supplied in the prescribed adjustment sequence, further optimize, in accordance with an aspect of the invention, impedance adjustments of RKN and RZN. Again this compensates for interaction between the adjustments of impedances RKN and RZN.

Operational block 832 causes adjustable impedance RKN values presently stored in RKN registers 1 and 2 to be averaged.

Operational block 833 causes the average value of RKN determined in operational block 832 to be loaded into RKN control register 709 (FIG. 7).

Operational block 834 causes adjustable impedance RZN values presently stored in RZN registers 2 and 3 to be averaged.

Operational block 835 causes the average value of RZN determined in operational block 834 to be loaded into RZN control register 707 (FIG. 7).

Operational block 836 causes control signals to be supplied to tone source 107 for disabling the first predetermined tone, i.e., 1300 Hz.

Operational block 837 causes control signals to be supplied to switching elements 106 and 108 (FIG. 1) for connecting unidirectional facilities 103 and 104, respectively, to bidirectional-to-unidirectional coupler 101, which now is adjusted to an impedance for obtaining an optimum match to a particular bidirectional facility 102 connected thereto.

The nonloaded facility routine is exited via oval 838.

It is the use of this unique prescribed adjustment sequence which allows the use of individual tone signals as compared to bands of noise. Otherwise, the rapid convergence to an adjustment realized by use of individual tones would not result. It is noted, however, that the sequence of the first and second iterative steps may be interchanged. The adjustment sequence of RKN first, then RZN second and RP third is important in obtaining an optimum match to a specific bidirectional facility.

FIG. 11 shows a flow chart of adjustable impedance RKN null program subroutine employed in the nonloaded facility routine shown in FIGS. 8, 9 and 10. This and the following amplitude null search subroutines are essentially identical. The null search routine, in accordance with an aspect of the invention, first steps corresponding impedance adjustment in a first predetermined direction until a first increase is detected in the amplitude of the signal at transmit port 112. Then, the impedance adjustment is stepped in a direction opposite to the first direction until a second increase is detected in the amplitude of the signal at transmit port 112. Thereafter, the impedance adjustment is stepped once in the first direction to obtain the desired amplitude null. This procedure simplifies the search routine.

Accordingly, the RKN null subroutine is entered via an oval 1101.

Conditional branch point 1102 tests to determine if the tone signal from tone source 107 (FIG. 1) is the first predetermined tone, i.e., 1300 Hz. If the test result is yes, control is transferred to operational block 1103 and first delay interval T1 is set. In an example from experimental practice, delay T1 is approximately 700 microseconds. Thereafter, control is transferred to operational block 1105. If the test result is no, the tone from tone source 107 is the second predetermined tone, i.e., 2600 Hz and control is transferred to operational block 1104 where a delay interval T2, in this example, approximately 333 microseconds is set. Thereafter control is also transferred to operational block 1105.

Operational block 1105 causes either delay interval T1 or T2 to be effected.

Operational block 1106 causes sample and hold circuit 508 (FIG. 5) to be disabled by supplying a logical "1" signal SMP (SMP=1) to switch 513, causing that switch to open circuit.

Operational block 1107 causes a wait interval until the next positive transition of signal TCLK from tone source 107 occurs.

Operational block 1108 enables sample and hold circuit 508 (FIG. 5) by supplying a logical "0" signal SMP (SMP=0) to switch 513, thereby causing the peak value of the output from peak detector 505 to be stored across hold capacitor 511.

Conditional branch point 1109 tests to determine whether adjustable impedance RKN register is full, i.e., in this example storing a number equal to 31. This guards against the possibility of overflowing the RKN register in CPU 702 (FIG. 7). If the test result is yes and the RKN register is full, control is transferred to operational block 1119. However, since this is the first run, it is unlikely that the RKN register is full and the test result is no. Consequently, control is transferred to operational block 1110.

Operational block 1110 causes the RKN register and RKN control register 709 (FIG. 7) to be incremented.

Operational block 1111 causes peak detector 505 to be disabled via switch 507 (FIG. 5) being closed by a PDR=1 for a prescribed interval, in this example approximately 50 microseconds.

Operational block 1112 causes the delay interval for enabling the peak detector to be effected by opening switch 507.

Operational block 1113 causes signal THSI (FIG. 5) to be interrogated.

Conditional branch point 1114 tests to determine if THSI is a logical 1. That is to say, whether the present output from peak detector 505 (FIG. 5) is greater than the last previously sampled value of the output from peak detector 505 stored on capacitor 511. If the test result is no, i.e., THSI=0, control is again transferred to operational block 1106 and the above process is iterated until an increase in the output from peak detector 505, i.e., an amplitude increase of the signal at transmit port 112, has been detected, thereby yielding a yes test result. Upon obtaining a yes test result, control is transferred to operational block 1115.

Opertional block 1115 causes sample and hold circuit 508 (FIG. 5) to be disabled via switch 513 being open by supplying SMP=1.

Operational block 1116 causes a wait interval until the next positive transition of signal TCLK from source 107 (FIG. 1).

Operational block 1117 causes sample and hold circuit 508 (FIG. 5) to be enabled via switch 513 being closed by SMP=0.

Conditional branch point 1118 tests whether the RKN register is empty, i.e., RKN register=0. This is to guard against underflow of the RKN register. If a yes test result is obtained, control is transferred to operational block 1125. If a no test result is obtained, control is again transferred to operational block 1119.

Operational block 1119 causes the RKN register in CPU 702 and RKN control register 709 to be decremented.

Operational block 1120 causes peak detector 505 to be again disabled for a prescribed interval.

Operational block 1121 causes the enable interval to be effected.

Operational block 1122 causes signal THSI to be interrogated.

Conditional branch point 1123 tests to determine whether THSI=1, i.e., That THSI indicates an increase in the sampled amplitude at transmit port 112. If the test result is no, control is again transferred to operational block 1115 and the above process is iterated until conditional branch point 1123 yields a yes test result. Upon detection of a yes test result, control is transferred to operational block 1124.

Operational block 1124 causes the RKN register and RKN control register 709 to be incremented.

Operational block 1125 causes the RKN value stored in the RKN register in CPU 702 to be copied into RKN register 1 in RAM 703.

Thereafter, control is returned to the main program via oval 1126.

FIG. 12 shows a flow chart of adjustable impedance RZN amplitude null search subroutine employed in the nonloaded facility routine shown in FIGS. 8, 9 and 10. The RZN null subroutine illustrated by elements 1201 through 1226 is essentially identical to the RKN null subroutine shown in FIG. 11, the only difference being that the RZN values are supplied to a RZN register in CPU 702, RZN control register 707 and a RZN register 1 in RAM 703.

FIG. 13 shows a flow chart of adjustable impedance RP null program subroutine employed in the nonloaded facility routine shown in FIGS. 8, 9 and 10. The RP null subroutine including elements 1301 and 1305 through 1326 is essentially identical to that described above for the RKN null subroutine shown in FIG. 11, the only differences being that operational block 1302 sets delay interval T3 which is approximately 3 milliseconds and no frequency present test is made. Additionally, the RP register full test in conditional branch point 1309 is 15 rather than 31 and the disable interval for the peak detector in operational block 1311 and 1320 in this example is approximately 300 microseconds. The RP values are also supplied to a RP register in CPU 702, RP control register 708 and a RP register 1 in RAM 703.

FIG. 14 is a flow chart of a main program routine for generating in control logic 105 control signals for automatically adjusting loaded adjustable impedance network 202 (FIG. 4). Accordingly, the loaded routine is entered at oval 1401.

Operational block 1402 causes the loaded facility routine to be initialized, i.e., clearing registers and the like.

Operational block 1403 causes RKL control register 709 and RZL control register 707 to be set to their respective midvalues.

Operational block 1404 causes tone source 107 (FIG. 1) to be enabled for generating a first tone signal, in this example 1300 Hz.

Operational block 1405 causes peak detector, sample and hold 109 (FIG. 1) to be disabled by supplying logical 1 PDR and SMP signals thereto, i.e., PDR=1, SMP=1.

Operational block 1406 interposes a predetermined delay interval to insure that transients resulting from the generation of the tone signal diminish. In this example, the delay is equal to 8 positive transitions of signal TCLK from tone source 107 or approximately 5 milliseconds.

Operational block 1407 causes peak detector, sample and hold 109 to be enabled by supplying logical 0 PDR and SMP signals thereto, i.e., PDR=0, SMP=0.

Operational blocks 1405, 1406 and 1407 in effect initialize the control circuitry prior to calling null search subroutines and are collectively designated initialize control 1408.

Operational block 1409 causes adjustable impedance RKL amplitude null search subroutine to be called. A flow chart of the RKL null subroutine is shown in FIG. 15 and is described below. The RKL null subroutine controls generation of signals to effect a first impedance adjustment in a prescribed sequence, in accordance with an aspect of the invention, to generate a first amplitude null at transmit port 112 (FIG. 1) while supplying the first predetermined tone to receive port 111. Upon detection of the desired amplitude null, control is transferred to operational block 1410.

Operational block 1410 causes control signals to be supplied to tone detector 107 for disabling the first predetermined tone signal, in this example 1300 Hz, and for enabling a second predetermined tone signal, in this example 325 Hz.

Operational block 1411 which is identical to operational block 1408 initializes the control function.

Operational block 1412 causes adjustable impedance RZL amplitude null subroutine to be called. A flow chart of the RZL null subroutine is shown in FIG. 16 and is described below. The RZL null subroutine controls generation of signals to effect a second impedance adjustment in the prescribed sequence, in accordance with an aspect of the invention, to generate a second amplitude null at transmit port 112 (FIG. 1) while supplying the second predetermined tone to receive port 111. Upon detection of the desired amplitude null, control is transferred to operational block 1413.

Operational block 1413 causes control signals to be supplied to tone source 107 for disabling the second predetermined tone, i.e., 325 Hz.

Operational block 1414 causes control signal BIP=0 to be supplied to switching elements 106 and 108 (FIG. 1) to disconnect tone source 107 and peak detector, sample and hold 109 and reconnect unidirectional facility 103 and 104 to receive port 111 and transmit port 112, respectively, of bidirectional-to-unidirectional coupler 101.

The loaded routine is exited via oval 1415.

FIG. 15 shows a flow chart of adjustable impedance RKL amplitude null search subroutine employed in the loaded facility routine shown in FIG. 14. The RKL null subroutine illustrated by elements 1505 through 1526 is essentially identical to the RKN null subroutine elements 1105 through 1126 shown in FIG. 11 and described above. The only differences between the subroutines being that the RKL values are supplied to an RKL register in CPU 702, RKL control register 709 and an RKL register 1 in RAM 703. Another difference is that no test is made to determine which delay interval is to be utilized. Accordingly, the delay in operational block 1502 is set to interval T1 of approximately 700 microseconds corresponding to 1300 Hz.

FIG. 16 shows a flow chart of adjustable impedance RZL amplitude null search subroutine employed in the loaded facility routine shown in FIG. 14. The RZL null subroutine including elements 1601, 1602 and 1605 through 1626 is essentially identical to the RKN null subroutine shown in FIG. 11 and described above. The differences between the routines being that no test is made to determine the tone frequency that is present and operational block 1602 sets the delay to interval T3 corresponding to a tone signal of 325 Hz. Additionally, the RZL registers full test in conditional branch point 1609 determines whether a count of 8 is present or not. Also, adjustable impedance RZL values are supplied to an RZL register in CPU 702, RZL control register 707 and an RZL register 1 in RAM 703.

APPENDIX

```
            ORG 0
            JMP BEGIN
            ORG 10
  BEGIN :   CLR A
            ORL P2,*008H
            IN A,P2
            ORL P2,*008H
            JB7 NONLDD
            JMP LOADED
  NONLDD :  ANL P1,*01FH
            MOV A,*010H
            OUTL P1,A
            ORL A,*020H
            OUTL P1,A
            MOV R0,*020H
            MOV @R0,A
            ANL P1,*01FH
```

APPENDIX -continued

```
            MOV A,*010H
            OUTL P1,A
            ORL A,*040H
            OUTL P1,A
            MOV R0,*022H
            MOV @R0,A
            ANL P1,*01FH
            MOV A,*018H
            OUTL P1,A
            ORL A,*060H
            OUTL P1,A
            MOV R0,*025H
            MOV @R0,A
            CALL T1300
            CALL RKNULL
            CALL T2600
            CALL RZNULL
            CALL T325
            CALL RPNULL
            CALL T2600
            MOV R3,A
            CALL ITER
            MOV R0,*020H
            MOV R1,*021H
            MOV A,@R0
            XCH A,@R1
            MOV R0,*023H
            MOV R1,*024H
            MOV A,@R0
            XCH A,@R1
            CALL T1300
            MOV R3,A
            CALL ITER
            MOV A,@01FH
            ANL A,@R1
            MOV R1,*024H
            XCH A,@R1
            ANL A,*01FH
            ADD A,@R1
            CLR C
            RRC A
            ANL P1,*01FH
            OUTL P1,A
            ORL A,*040H
            OUTL P1,A
            MOV R0,*022H
            MOV @R0,A
            MOV R0,*020H
            MOV R1,*021H
            MOV A,*01FH
            ANL A,@R1
            XCH A,@R0
            ANL A,*01FH
            ADD A,@R0
            CLR C
            RRC A
            ANL P1,*01FH
            OUTL P1,A
            ORL A,*020H
            OUTL P1,A
            MOV R0,*020H
            MOV @R0,A
            CLR A
            OUTL P2,A
  LOADED :  JMP $
  ITER :    MOV A,R3
            CALL RKNULL
            MOV R0,*022H
            MOV R1,*023H
            MOV A,@R0
            XCH A,@R1
            MOV A,R3
            CALL RZNULL
            MOV R1,*023H
            MOV A,@R1
            XRL A,@R0
            JZ $+4
            JMP ITER
            RET
  RKNULL :  CALL DELAY
            MOV R0,*020H
```

APPENDIX -continued

```
             CALL SETREG
             RET
RZNULL :     CALL DELAY
             MOV R0,*022H
             CALL SETREG
             RET
RPNULL :     CALL DELAY
             MOV R0,*025H
             CALL SETREG
             RET
DELAY :      MOV R1,*026H
             JB3 LNGDLY
             MOV @R1,*015H
             RET
LNGDLY :     JB2 TTF
             MOV @R1,*02EH
             RET
TTF :        MOV @R1,*0C1H
             RET
TIME :       RET
T1300 :      MOV A,*039H
             OUTL P2,A
             MOV A,*0F9H
             MOV T,A
             STRT CNT
             JTF $+4
             JMP $-2
             STOP TCNT
             ANL P2,*009H
             RET
T2600 :      MOV A,*03AH
             OUTL P2,A
             MOV A,*0F1H
             MOV T,A
             STRT CNT
             JTF $+4
             JMP $-2
             STOP TCNT
             ANL P2,*00AH
             RET
T325 :       MOV A,*03BH
             OUTL P2,A
             MOV A,*0FEH
             MOV T,A
             STRT CNT
             JTF $+4
             JMP $-2
             STOP TCNT
             ANL P2,*00BH
             RET
SETREG :     JNT1 SETREG
             MOV A,@R1
             MOVR 4,A
SETWT :      CALL TIME
             DJNZ R4,SETWT
NEXT :       ORL P2,*010H
WT :         JNT1 WT
             ANL P2,*0EFH
             ORL P2,*020H
             MOV A,@R0
             ANL A,*01FH
             XRL A,*01FH
             JNZ $+4
             JMP $+20
             INC @R0
             CALL NUPK
             JNT0 SKIP
NNEXT :      ORL P2,*010H
WT2 :        JNT1 WT2
             ANL P2,*0EFH
             ORL P2,*020H
             MOV A,@R0
             ANL A,*01FH
             JZ $+11
             MOV A,@R0
             DEC A
             MOV @R0,A
             CALL NUPKL
             JNT0 NNNEXT
             INC @R0
             MOV A,@R0
```

APPENDIX -continued

```
             ANL P1,*01FH
             ANL A,*01FH
             OUTL P1,A
             MOV A,@R0
             OUTL P1,A
             RET
NUPK :       MOV A,@R0
NUPKL :      ANL P1,*01FH
             ANL A,*01FH
             OUTL P1,A
             MOV A,@R0
             OUTL P1,A
             MOV R5,*005H
SMDLY :      DJNZ R5,SMDLY
             ANL P2,*0DFH
             MOV A,@R1
             CPL A
             ADD A,*004H
             CPL A
             MOV R4,A
DLY :        CALL TIME
             DJNZ R4,DLY
             RET
NNNEXT :     JMP NNEXT
SKIP :       JMP NEXT
             END
```

We claim:

1. A transmission network (FIG. 1, 101) having receive (111) and transmit (112) ports and at least a third port adapted to couple a bidirectional (2-wire) transmission facility (102) to receive (103) and transmit (104) unidirectional facilities (4-wire) including a controllably adjustable impedance network (FIG. 2, 202) in circuit relationship with at least said receive (111) and transmit (112) ports, responsive to control signals, and having a plurality of adjustable impedance elements (FIG. 3, RKN, RZN, RP or FIG. 4, RKL, RZL) for obtaining an optimum match to the impedance of the bidirectional facility (102), CHARACTERIZED BY, a controllable source (107) of at least a plurality of individual tone signals each having a predetermined frequency (for example, 1300 Hz, 2600 Hz, 325 Hz), means (109) for detecting signal amplitude values at the transmit port (112) of the transmission network (101), and means (105) for generating control signals to control supplying the individual tone signals (from 107) to the receive port (111) of the transmission network (101) and to control adjusting in a prescribed sequence (FIGS. 8-10 or 14) the individual impedance elements (RKN, RZN and RP, or RKL and RZL) while a predetermined tone (for example, 1300 Hz, 2600 Hz or 325 Hz) is supplied to the receive port (111) for obtaining an amplitude null (detected via 109) at the transmit port (112) for each impedance element (RKN, RZN and RP or RKL and RZL) in said sequence, so that transhybrid loss between the receive port (111) and transmit port (112) is maximized.

2. The invention as defined in claim 1 wherein said control signal generating means (105) further generates signals to effect a first iterative impedance adjustment step including generation of signals for controlling said tone source (107) to supply a predetermined individual one of said tone signals (FIG. 9, 818, for example 2600 Hz) to the receive port (111), for adjusting first and second predetermined ones of the impedance elements (RKN, RZN via 709, 707, respectively) in a predetermined sequence (FIG. 9, 820–823) to obtain amplitude nulls (via 109) at the transmit port (112) and for repeating adjustment of said first and second impedance elements in said predetermined sequence (FIG. 9, 820–823) until the impedance value setting of said second impedance element (RZN) which an amplitude null is detected (via 109) does not change (823) after repeating said predetermined adjustment sequence.

3. The invention as defined in claim 2 wherein said control signal generating means (105) further generates signals to effect a second iterative impedance adjustment step including generation of signals for controlling said tone source (107) to supply another predetermined individual one of said tone signals (FIG. 10, 826, for example 1300 Hz) to the receive port (111), for adjusting said first and second impedance elements (RKN, RZN) in a predetermined sequence (FIG. 10, 828–831) to obtain amplitude nulls (via 109) at the transmit port (112) and for repeating adjustment of said first and second impedance (FIG. 10, 828–831) elements in said predetermined sequence while supplying said another predetermined tone signal (e.g., 1300 Hz) to the receive port (111) until the impedance value setting of said second impedance element (RZN) does not change (831) after repeating said predetermined adjustment sequence.

4. The invention as defined in claim 3 wherein said control signal generating means (105) further generates control signals (832–835) for setting said first (RKN) and second (RZN) impedance elements to impedance settings (via 709 and 707, respectively) equal to the average of the respective impedance element values obtained in said first (820–823) and second (828–831) iterative impedance adjustment steps.

5. The invention as defined in claim 1 wherein said control signal generating means (105) responds to an output signal (THSI) from said amplitude detecting means (109) for further generating control signals to adjust a corresponding adjustable impedance element (RKN, RZN, RP, RKL, or RZL) by incremental steps in a first direction to obtain a change in said detecting means output signal (THSI) indicating a first increase in amplitude (for example FIG. 11, 1106–1114), then to adjust said corresponding adjustable impedance element (RKN, RZN, RP, RKL, or RZL) by incremental steps in a second direction opposite said first direction to obtain a change in said detecting means output signal (THSI) indicating a second increase in amplitude (for example, FIG. 11, 1115–1123) and then to adjust the impedance element one step in said first direction to obtain an amplitude null (1124).

6. The invention as defined in claim 1 wherein said amplitude detecting means (109) includes peak detection means (FIG. 5, 505) for detecting the present peak amplitude at the transmit port (112), means for sampling (513) and holding (511) an amplitude value representation of an output from said peak detector means (505), and means (509, 510, 514) for comparing the sampled and held amplitude value (on 511) with a present amplitude output from said peak detector (505) to generate an output signal (THSI) representative of whether the present output from said peak detector (505) is larger or smaller than the sampled and held amplitude value (on 511).

7. The invention as defined in claim 1 wherein said control signal generating means (105), includes central processor means (FIG. 7, 702), clock means (701) for supplying a first timing signal to said central processor means (702), read-write memory means (703), read only memory means (704), input/output means (I/O 705), bus means (706) and a plurality of control registers (707–709).

8. The invention as defined in claim 7 wherein a set of instructions are stored in said read-only memory (ROM) for controlling said control signal generating means (105) to effect adjustment of the adjustable impedance elements (RKN, RZN, RP or RKL, RZL) in a prescribed sequence (FIGS. 8, 9 and 10 or FIG. 14) by supplying a first tone signal (for example 1300 Hz from 107) to the receive port (111), adjusting (via 709) a first adjustable impedance element (RKN or RKL) until an amplitude null is detected at the transmit port (112 via 109 and FIG. 11, 1101–1126 or FIG. 15, 1501–1526) and supplying a second tone signal (for example 2600 Hz or 325 Hz from 107) to the receive port (111), adjusting (via 707) a second adjustable impedance element (RZN or RZL) until an amplitude null is detected at the transmit port (112 via 109 and FIG. 12, 1201–1226 or FIG. 16, 1601–1626).

9. The invention as defined in claim 8 wherein said set of instructions further includes instructions for controlling said control signal generating means (105) to effect adjustment of a third impedance element (RP) by supplying a third tone signal (for example 325 Hz from 107) to the receive port (111), and adjusting (via 708) said third impedance element (RP) until an amplitude null is detected at the transmit port (112 via 109 and FIG. 13, 1301–1326).

10. The invention as defined in claim 9 wherein said set of instructions stored in said read-only memory (ROM 704) further includes instructions for controlling said control signal generating means (105) to effect further adjustment of predetermined ones of said adjustable impedance elements (RKN, RZN) in a first iterative process (820–823) by again supplying (818) said second tone signal (2600 Hz) to the receive port (111), adjusting (820) said first impedance element (RKN) until an amplitude null is detected at the transmit port (112 via 709 and FIG. 11), then adjusting (822) said second impedance element (RZN) until an amplitude null is detected at the transmit port (112 via 707 and FIG. 12), repeating adjustment of said first (RKN) and second (RZN) impedance elements in the first iterative process (via 820–823) until the impedance value of said second impedance element (RZN) remains constant after repeating said adjustments in a second iterative process (828–831) by again supplying (826) said first tone signal (1300 Hz) to the receive port (111), adjusting (828) said first impedance element (RKN) until an amplitude null is detected at the transmit port (112, FIG. 11), then adjusting (830) said second impedance element (RZN) until an amplitude null is detected at the transmit port (112, FIG. 12), repeating adjustment of said first (RKN) and second (RZN) impedance elements in the second iterative process (via 828–831) until the impedance value of said second impedance element (RZN) remains constant after repeating said adjustments, averaging impedance values for said first (RKN) and second (RZN) impedance elements obtained in said first and second iterative processes, and utilizing said average values to adjust said first (RKN via 709) and second (RZN via 707) impedance elements to obtain an optimum impedance match to a particular bidirectional facility (102).

* * * * *